United States Patent Office 3,343,425
Patented Sept. 26, 1967

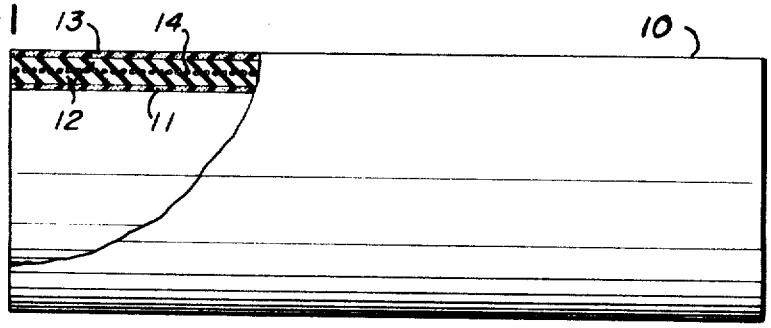
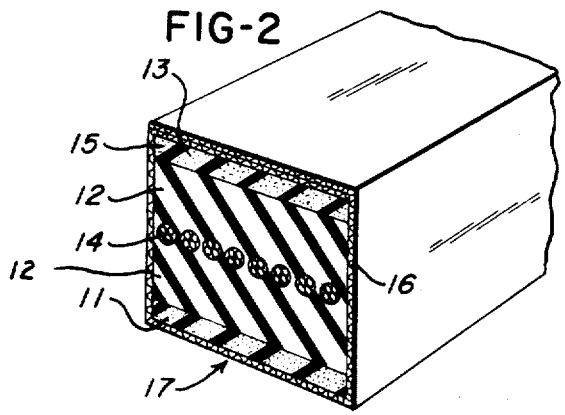
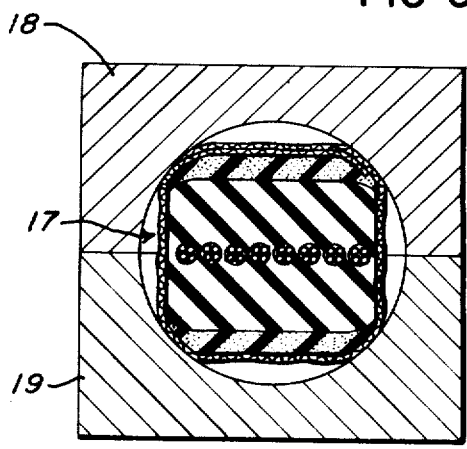
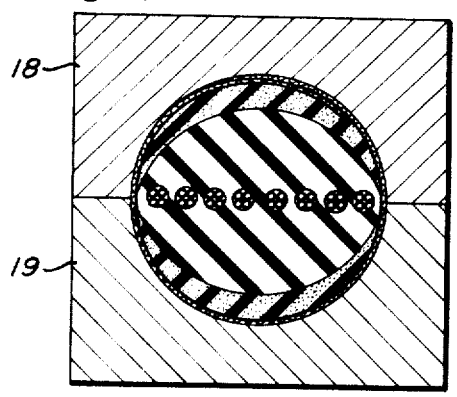
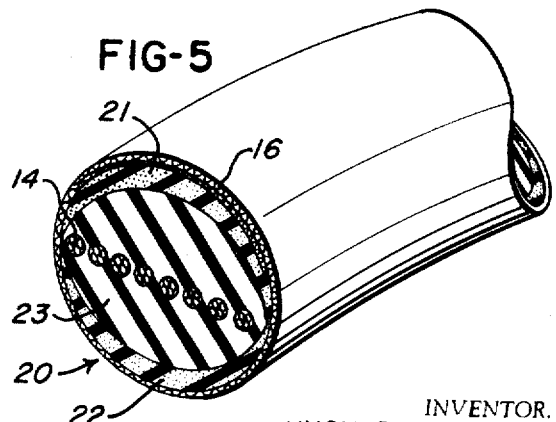

3,343,425
TRANSMISSION BELT
Hugh D. Terhune, Springfield, Mo., assignor to Dayco Corporation, a corporation of Delaware
Filed Sept. 14, 1965, Ser. No. 487,136
4 Claims. (Cl. 74—238)

ABSTRACT OF THE DISCLOSURE

A transmission belt with a circular cross section having laterally spaced cords in which a portion of the periphery of the body is formed of a blown rubber material.

This invention relates to transmission belts, and more particularly to a continuous rubber transmission belt of improved construction having a circular cross section, more commonly known as a "round" belt. The round belt described in the present application is one having a cover fabric completely around the periphery of the belt in which the fabric is maintained tightly about the body of the belt. This is accomplished in the present application by applying outward pressure within the body of the belt during vulcanizing, this outward pressure being created by the addition of a blowing agent to certain portions of the body of the belt. Because of this outward pressure the cover which would otherwise tend to be somewhat loose is stretched tightly around the entire periphery of the belt. The use of a blowing agent for creating a stretching effect on a conventional trapezoidal belt has previously been described in United States Patent No. 3,164,026, of common assignment.

Round belts have been in general use for power transmission for many years, and although the most popular belt used in transmission is one having a trapezoidal cross section, commonly known as a V-belt, there are certain types of drives where a round belt has great utility. The round belt is constructed with a neutral axis or strength section exactly at the center, unlike the trapezoidal belt, and, therefore, provides certain inherent advantages in transmission systems, such as one in which there may be a reverse or backside transmission so that it is important to use the top or bottom of the belt interchangeably. While a wrapped round belt per se is not new, it has been very difficult in the manufacture of such belts to wrap the belt in such a manner that the outer fabric is tightly wrapped. The tightness of this outer fabric is important to create the necessary friction and wear resistance in the belt. The novel process and the novel belt resulting therefrom, therefore, represent a considerable improvement over the prior art of building belts having a round cross section.

It is a principal object of the invention, therefore, to provide an improved round belt.

It is a further object to provide such a belt having a cover applied tightly and evenly about the outer periphery.

These and other objects will be readily apparent from the following specification, claims, and drawings, in which:

FIGURE 1 is an elevational view in partial section of a belt sleeve built in accordance with the present invention.

FIGURE 2 is a fragmentary perspective view in partial section of a belt body prior to the final molding step.

FIGURE 3 is a sectional elevational view illustrating a first step in molding the novel belt.

FIGURE 4 is a view similar to FIGURE 3 illustrating the final molding step.

FIGURE 5 is a fragmentary perspective view in partial section illustrating the finished belt.

Referring to the drawings, FIGURE 1 illustrates a completed belt sleeve 10 which has been fabricated in a conventional manner around a building drum, in which the various layers of the sleeve are fabricated around the drum in the following manner. The first step consists of forming an inner layer 11 of natural or synthetic rubber into which has been milled a blowing agent. This blowing agent is any suitable material such as ammonium bicarbonate, ammonium carbonate, sodium bicarbonate, sodium carbonate, or diazoaminobenzene. The blowing agent is milled into the rubber to create a thorough dispersion therein so that upon application of heat the blowing agent will cause the section 11 to expand and create pressure in whichever direction it is permitted to expand. The section 11 is formed into a thin sheet of material and wrapped around a building mandrel in conventional fashion. Surmounting this inner member 11 is a member 12 which consists of natural or synthetic rubber of the type normally used in building the compression or tension section of a belt. Around this layer 12 is then wrapped a continuous cord 14 in helical fashion (as is conventional in belt building), and then an additional layer 12 is placed thereover. The final step of the construction of the sleeve consists of placing another layer 13 of blow stock similar to the layer 11 around the entire assembly. This assembly is then removed from the mandrel and cut into a plurality of individual continuous belt bodies having a rectangular or square cross section, each of these sections being subsequently wrapped with a continuous cover of rubberized (rubber impregnated or coated) fabric 16 to create the finished belt body 17 shown in FIGURE 2. This body thus consists of the cord 14 at the neutral axis which is centrally located, layers of rubber 12 on both sides of the neutral axis, and layers of blow stock 11 and 13 outwardly thereof each having a blowing agent 15 incorporated therein; this entire assembly is then wrapped with the fabric 16 as shown. In this condition the body has a smaller volume than the mold cavity in order to permit the mold to close completely. The cover is wrapped fairly tightly but permits sufficient stretch to fill the cavity while retaining flexibility.

All the material used to make up the belt body is, of course, formed of unvulcanized materials. To vulcanize the body into a finished belt and at the same time to form it into the round shape which is desired, the body 17 is placed between upper and lower mold members 18 and 19 which are closed to a mating position and then heat is applied while in this position. During this heating the blowing agent 15 expands and blows to create sections 21 and 22 which are approximately crescent-shaped in cross section as shown in FIGURES 4 and 5. These sections create inward pressure against the principal portion of the belt body, and at the same time create outward pressure against the cover material 16 which stretches it tightly about the entire periphery of the belt. At the same time, the remainder of the belt is vulcanized to form the main body section 23. The resulting belt 20, which is shown in FIGURE 5, is thus one having a circular cross section and a cover which is tightly wrapped about the body, as desired. The layers 12 have flowed together to form a unitary body which surrounds the cord and to provide an assembly which makes up the principal portion of the belt. In the final form, the cord remains laterally spaced across substantially the entire width of the finished belt, and located at the major diameter, or major axis, which is parallel to the plane about which the belt travels during its operation. The portions of the periphery of the belt which comprise the blown rubber are opposite this major axis.

The final product is a belt which may be used in a transmission wherein a stretched cover is important for wear resistance and proper driving friction, and has several other advantages such as reversibility and the ability to drive equally from either side. In addition, the blown sections provide excellent shock resistance, such as during periods of start-up. Another important advantage of this structure involves the elimination of flash trimming required on conventional round belts; in these belts it is necessary to build them with a larger cross section than the mold in order to obtain proper pressure on the cover. This causes a flash to be formed between the mold halves, which must be trimmed; however, the cover material is part of the flash and will be cut during the trimming, thus reducing the usefulness of this cover. The use of the blown sections eliminates this problem because it is possible to build the belt body smaller than the mold, rather than larger than the mold.

Other variations are possible within the scope of the invention. Conventional belt building methods take many forms and any of these conventional methods may be utilized while retaining the concept of forming a round belt by the use of the blow stock material.

What is claimed is:

1. An endless transmission belt having a circular cross section containing a plurality of windings of a longitudinally extending helically wound continuous cord located at a major axis, said windings spaced laterally across substantially the entire width of said belt, and a rubber body surrounding said cord, a portion of the periphery of said body consisting of blown rubber material.

2. The belt of claim 1 in which said belt is enclosed by a stretched cover.

3. The belt of claim 1 in which said blown rubber material is disposed opposite said major axis.

4. The belt of claim 1 in which said blown rubber material is approximately crescent-shaped in cross section.

References Cited

UNITED STATES PATENTS 2,519,590   8/1950   Mitchell _____ 74—233 X
3,164,026   1/1965   Terhune _____ 74—233

FRED C. MATTERN, Jr., *Primary Examiner.*

J. A. WONG, *Assistant Examiner.*